Feb. 12, 1929.

R. L. CLEWELL

FISH LURE

Filed March 23, 1927

1,701,528

Inventor

R. L. Clewell

By Frease and Bond
Attorneys

Patented Feb. 12, 1929.

1,701,528

UNITED STATES PATENT OFFICE.

ROBERT L. CLEWELL, OF CANTON, OHIO.

FISH LURE.

Application filed March 23, 1927. Serial No. 177,605.

The invention relates to artificial bait or lures arranged to be drawn through the water and rotated to imitate the swimming movement of an eel or snake, and more particularly to improvements of the fish lures set forth and described in the prior application for patent of Robert L. Clewell and Charles W. Clewell, filed July 13, 1926, Serial No. 122,110.

The object of the present invention is to provide improvements including a stationary head swivel attached to the fish lure body of the aforesaid prior application, which may be in the form of a snake or eel of sinuous helical spiral form, provided with hooks, and arranged to be rotated as it is drawn through the water to produce a movement similar to the swimming movement of a snake or eel, and a further object of the present invention is to provide a hollow helical spiral form which may float upon the water and rotate thereover.

These and ancillary objects may be attained by a construction and arrangement hereinafter set forth in detail and which may be stated in general terms as including a relatively stationary head for connection with a fish line or the like, a spiral shaped rotatable body similar to that of a snake or eel which may be hollow, and a swivel connection between the body and the head.

Figure 1:
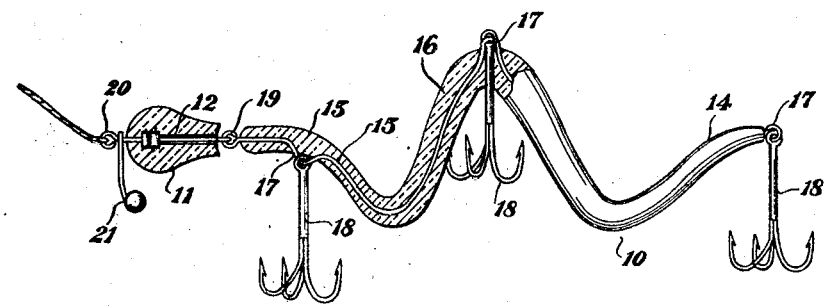
Figure 2:
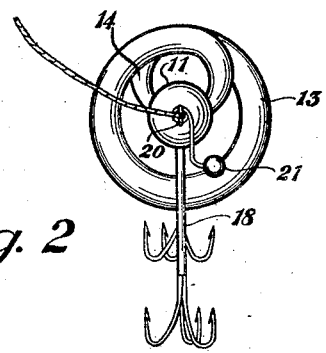

Embodiments of the invention are illustrated in the accompanying drawing forming part hereof, in which Figure 1 is an elevation view with portions in section of one form of the improved fish lure;

Fig. 2, an end elevation of the same; and

Figure 3:
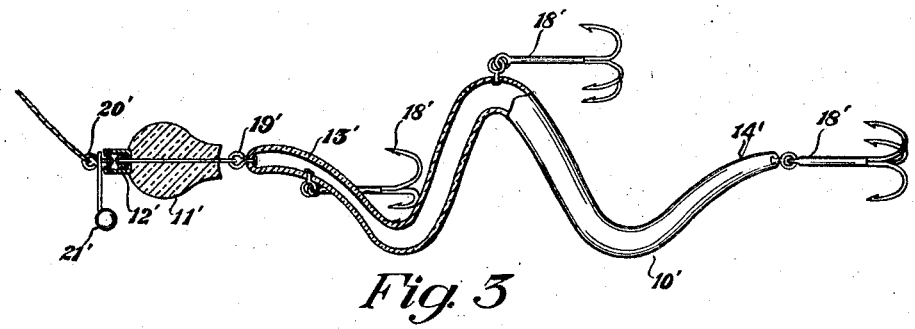

Fig. 3, a similar view of a modified form including a hollow body.

Similar numerals refer to similar parts throughout the drawing.

The improved fish lure indicated generally at 10 in Figs. 1 and 2, includes a relatively stationary head 11 provided with a swivel connection 12 joining it with the rotatable body 13 preferably in the form of a snake or eel of sinuous helical spiral shape, and the head 11 preferably being located in the axis of the spiral. The tail 14 of the lure also preferably terminates in the axis of the spiral.

The external surface of the head and body of the lure, may be painted or decorated to give the appearance of a snake or an eel or the like.

The body 13 is preferably made by providing a wire back bone 15 and imbedding the same in yielding material such as rubber or the like 16. Loops 17 of the wire back bone 15 may extend out of the rubber at desired locations along the body of the lure for connection with suitable hooks 18.

The forward end 19 of the wire back bone forms a suitable connection with the swivel connector 12 of the head. The head is provided with a forwardly extending eye 20 for attachment to the fish line, and a depending weight 21 connected with the eye 20 provides a means for maintaining the head 11 relatively stationary with respect to the rotating body 13 when the same is being drawn through the water.

When the lure is drawn through the water, as in casting or trolling, the spiral formation of the body will cause it to rotate in the water.

The modified improved fish lure indicated generally at 10' in Fig. 3, includes a relatively stationary head 11' provided with a swivel connection 12' joining it with the hollow rotatable body 13', preferably in the form of a snake or eel of sinuous helical spiral shape, and the head 11, preferably being located in the axis of the spiral. The tail 14' also preferably terminates in the axis of the spiral.

The external surface of the head and body of the lure, may be painted or decorated to give the appearance of a snake or an eel or the like. The hollow body 13' is preferably made of a suitable molded material, and suitable hooks 18' are connected therewith at desired locations and a forward end 19' connects the body with the swivel connector 12' of the head.

The head is provided with a forwardly extending eye 20' for attachment to the fish line, and a depending weight 21' connected with the eye 20' provides a means for maintaining the head 11' relatively stationary with respect to the rotating body 13' when the same is being drawn over the water.

When the lure 10' is drawn over the water, as in casting or trolling, the spiral formation of the hollow body will cause it to rotate on the water.

A preferred method of making the body of the fish lure illustrated in Figs. 1 and 2 consists of imbedding, as by molding, a straight back bone made of wire or the like, in the body forming material, and then forming the back bone and material into the helical spiral form.

I claim:

1. A fish lure including a head, a sinuous body of helical spiral form, and a swivel connection between the head and the body, and the body including a helical spiral back bone and body forming material imbedding the back bone, hooks carried by the back bone and means for attaching a line for drawing the lure through the water.

2. A fish lure including a head, a sinuous body of helical spiral form, and a swivel connection between the head and the body, and the body including a helical spiral back bone and body forming material imbedding the back bone.

3. A fish lure including a head, a sinuous body of helical spiral form, and a swivel connection between the head and the body, and the body including a helical spiral back bone and rubber and the like imbedding the back bone, hooks carried by the back bone and means for attaching a line for drawing the lure through the water.

4. A fish lure including a head, a sinuous body of helical spiral form, and a swivel connection between the head and the body, and the body including a helical spiral back bone and rubber and the like imbedding the back bone.

5. A body for a fish lure and the like including a helical spiral back bone and body forming material imbedding the back bone and the back bone determining and maintaining the axial curvature of the body.

6. A body for a fish lure and the like including a helical spiral back bone and body forming material including rubber and the like imbedding the back bone and the back bone determining and maintaining the axial curvature of the body.

7. A body for a fish lure and the like including a helical spiral back bone and yielding body forming material imbedding the back bone and the back bone determining and maintaining the axial curvature of the body.

8. A body for a fish lure and the like including a helical spiral back bone and body forming material imbedding the back bone, there being loops in the back bone and hooks secured to the loops and the back bone determining and maintaining axial curvature of the body.

In testimony that I claim the above, I have hereunto subscribed my name.

ROBERT L. CLEWELL.